United States Patent
Weindorf

(10) Patent No.: US 6,717,559 B2
(45) Date of Patent: Apr. 6, 2004

(54) TEMPERATURE COMPENSATED PARALLEL LED DRIVE CIRCUIT

(75) Inventor: Paul F. L. Weindorf, Novi, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 234 days.

(21) Appl. No.: 09/939,493

(22) Filed: Aug. 23, 2001

(65) Prior Publication Data

US 2002/0135572 A1 Sep. 26, 2002

Related U.S. Application Data

(60) Provisional application No. 60/261,760, filed on Jan. 16, 2001.

(51) Int. Cl.$^7$ ............................................. G09G 3/36
(52) U.S. Cl. ............................................. 345/82; 345/92
(58) Field of Search ................... 345/102, 82; 340/716; 359/487; 315/291

(56) References Cited

U.S. PATENT DOCUMENTS

| | | | | |
|---|---|---|---|---|
| 3,925,690 A | | 12/1975 | Spence ........................ 307/270 |
| 3,943,694 A | * | 3/1976 | Hofer .......................... 368/256 |
| 4,026,102 A | * | 5/1977 | Wecker ........................ 368/83 |
| 4,090,189 A | | 5/1978 | Fisler ......................... 340/335 |
| 4,160,934 A | | 7/1979 | Kirsch ........................ 307/297 |
| 4,513,242 A | * | 4/1985 | Yokogawa .................. 323/352 |
| 4,864,197 A | * | 9/1989 | Fitzgerald ................... 315/408 |
| 4,959,642 A | | 9/1990 | Sharples ..................... 340/716 |
| 5,359,691 A | | 10/1994 | Tai et al. ..................... 385/146 |
| 5,390,276 A | | 2/1995 | Tai et al. ..................... 385/146 |
| 5,422,756 A | | 6/1995 | Weber ......................... 359/487 |
| 5,528,720 A | | 6/1996 | Winston et al. ............. 385/146 |
| 5,828,488 A | | 10/1998 | Ouderkirk et al. .......... 359/482 |
| 6,069,448 A | | 5/2000 | Yeh ............................. 315/419 |
| 6,069,449 A | | 5/2000 | Murakami .................. 315/158 |
| 6,107,985 A | | 8/2000 | Walukas et al. ............. 345/102 |
| 6,124,971 A | | 9/2000 | Ouderkirk et al. .......... 359/487 |
| 6,147,723 A | | 11/2000 | Mochizuki .................. 349/62 |
| 6,150,771 A | | 11/2000 | Perry .......................... 315/291 |
| 6,445,444 B2 | * | 9/2002 | Dunne ........................ 356/5.08 |

OTHER PUBLICATIONS

OSRAM Opto Semconductors brochure entitled "High Brightness—High Temperature Power Topled®", printed by Infineon Technologies, undated, 4 pages.
OSRAM Opto Seminconductors Innovative Technology Sets New Standards brochure entitled "LED In General Lighting," printed by OSRAM Sylvania, Inc., undated, 16 pages.
OSRAM Opto Semiconductors brochure entitled "LED For Traffic Applications", printed by Infineon Technologies, undated, 9 pages.
Bond Ply™ 100 brochure entitled Thermally Conductive, Pressure Sensitive Adhesive Tape, printed by The Berquist Company, dated Jan. 25, 2001, 1 page.
Sheldahl product bulletin for Standard Flex, Single Layer Flexible Circuit Interconnect, printed by Sheldahl, undated, 2 pages.

(List continued on next page.)

Primary Examiner—Vijay Shankar
Assistant Examiner—Nitin Patel
(74) Attorney, Agent, or Firm—Brinks Hofer Gilson & Lione

(57) ABSTRACT

A light emitting diode drive circuit provides each of the plurality of parallel light emitting diodes substantially uniform current, causing the light emitting diodes to each have substantially the same brightness. An optional control circuit controls the current flow as a function of an external control signal. Optional temperature derating circuits adjust the intensity of the light emitting diodes as a function of a measured temperature. The measured temperature may be provided externally via a temperature output signal. The light emitting diode drive circuit may be specially adapted for automotive applications.

40 Claims, 6 Drawing Sheets

OTHER PUBLICATIONS

Sheldahl product bulletin for Standard Flex, Double Layer Flexible Circuit Interconnect, printed by Sheldahl, undated, 2 pages.

Sheldahl product bulletin for *Novaflex®* HD, High Density Flexible Circuit Interconnect, printed by Sheldahl, undated, 2 pages.

Sheldahl product bulletin for *Novaflex®* VHD, Very High Density Flexible Circuit Interconnect, printed by Sheldahl, undated, 2 pages.

Sheldahl product listing for Flexible Interconnect Products, from <http://www.shedahl.com/Product/FlexInter.htm>, printed from the Internet on Sep. 13, 2001, 2 pages.

* cited by examiner

TEMPERATURE COMPENSATED PARALLEL LED DRIVE CIRCUIT

REFERENCE TO RELATED APPLICATION

This application claims the benefit of U.S. Provisional Application No. 60/261,760, filed Jan. 16, 2001, titled "AMLCD LED Backlighting Navigation Radio Display."

BACKGROUND

This invention relates generally to the field of light emitting diode ("LED") drive circuits, and more specifically to the fields of current controlled LED drive circuits and temperature compensated LED drive circuits.

Backlighting for active matrix liquid crystal displays ("AMLCD") typically uses a cold cathode fluorescent lamp ("CCFL") device. CCFL devices tend to have high back lighting efficacies. CCFL devices have numerous drawbacks. For example, CCFL devices may contain Mercury, a highly dangerous substance that has been banned from many AMLCD applications. CCFL devices may have poor efficacy at lower temperatures, which requires additional circuitry such as a heater element or a boost current circuit. CCFL devices may have a non-linear efficacy curve with respect to temperature. CCFL devices may require an inverter to drive the CCFL device. CCFL devices may require complex control schemes, including light sensors and temperature sensors to provide adequate dimming ratios for night time operations. CCFL devices may have a short life expectancy, especially at lower operating temperatures, and may require additional electromagnetic interference ("EMI") shielding and electric filtering.

Alternatives to CCFL devices for back lighting an AMLCD include Xenon-based devices. Xenon-based backlighting circuits do not contain Mercury, have superior low temperature life expectancy and low temperature operational characteristics, and have less phosphor degradation than CCFL devices. However, Xenon lamps tend to be relatively expensive and require complex control circuitry. Xenon lamps have low efficacy. For example, a Xenon lamp with twice the diameter may provide only half the brightness of a mercury-based CCFL lamp. Because the efficacy of the Xenon lamp may be less than half of a CCFL lamp, the additional power needed to power a Xenon based circuit creates a problem of power consumption. While Xenon lamps correct many of the problems of the CCFL lamp technology, the Xenon lamp technology creates many new problems. Thus, there is a need in the LCD field to create a new and useful back light device and drive circuit.

SUMMARY

A light emitting diode drive circuit provides each of a plurality of parallel light emitting diodes substantially uniform current, causing the light emitting diodes to each have substantially the same brightness. An optional control circuit controls the current flow as a function of an external control signal. Optional temperature derating circuits adjust the intensity of the light emitting diodes as a function of a measured temperature. The measured temperature may be provided externally via a temperature output signal. The light emitting diode drive circuit may be specially adapted for automotive applications.

The foregoing discussion has been provided only by way of introduction. Nothing in this section should be taken as a limitation on the following claims, which define the scope of the invention.

BRIEF DESCRIPTION OF THE DRAWINGS

The components in the figures are not necessarily to scale, emphasis instead being placed upon illustrating the principles of the invention. Moreover, in the figures, like reference numerals designate corresponding parts throughout the different views.

DETAILED DESCRIPTION

A. Definitions

AMLCD—Active matrix Liquid Crystal Display.
CCFL—Cold cathode fluorescent lamp.
CCFL inverter—A circuit that provides the necessary voltage and current to properly control the light output of a CCFL.
IRDA—Infrared data association.
LCD—Liquid crystal display.
EDR—Enhanced diffuse reflector.
LED—Light emitting diode.
Lumen—A unit of light power useful to the human eye and defined as the spectral luminous efficacy for monochromatic light at the peak visual response wavelength of 555 nm.
NIT—A unit of luminance for light reflected, transmitted, or emitted by a diffusing surface.
PWM—Pulse width modulation.

B. Introduction

The improved LED drive circuit provides backlighting for AMLCDs with numerous LEDs, eliminating many of the problems associated with CCFL and Xenon systems. The improved LED drive circuit also provides improved LED control for other applications. The LEDs are configured in parallel and are current sourced to reduce brightness variation between LEDs. The LEDs are connected with ground to provide a superior thermal path for dissipating heat from the LEDs and to reduce and equalize the junction temperatures. Maximum LED brightness is achieved with the control circuit. The improved LED circuit operates at a lower supply voltage than conventional systems. White balance between red, green, and blue LEDs are achieved by selecting appropriate current source emitter resistors. The improved LED drive circuit may be implemented on a thinner wiring board or a flex board because of a single control line and distributed current source configuration. The complex inverter required by CCFL devices is eliminated. A temperature signal is provided that allows a software implemented adjustment to the input signal to maintain constant LED brightness at various junction temperatures and to derate the LEDs to prolong the life expectancy of the LEDs. A temperature derating circuit prolongs the life expectancy of the LEDs by automatically derating the LEDs or shutting down the LEDs.

The following description of the preferred embodiments of the invention is not intended to limit the scope of the invention to these preferred embodiments, but rather to enable any person skilled in the art to make and use the invention.

The Light Emitting Diode Circuit

Figure 1:
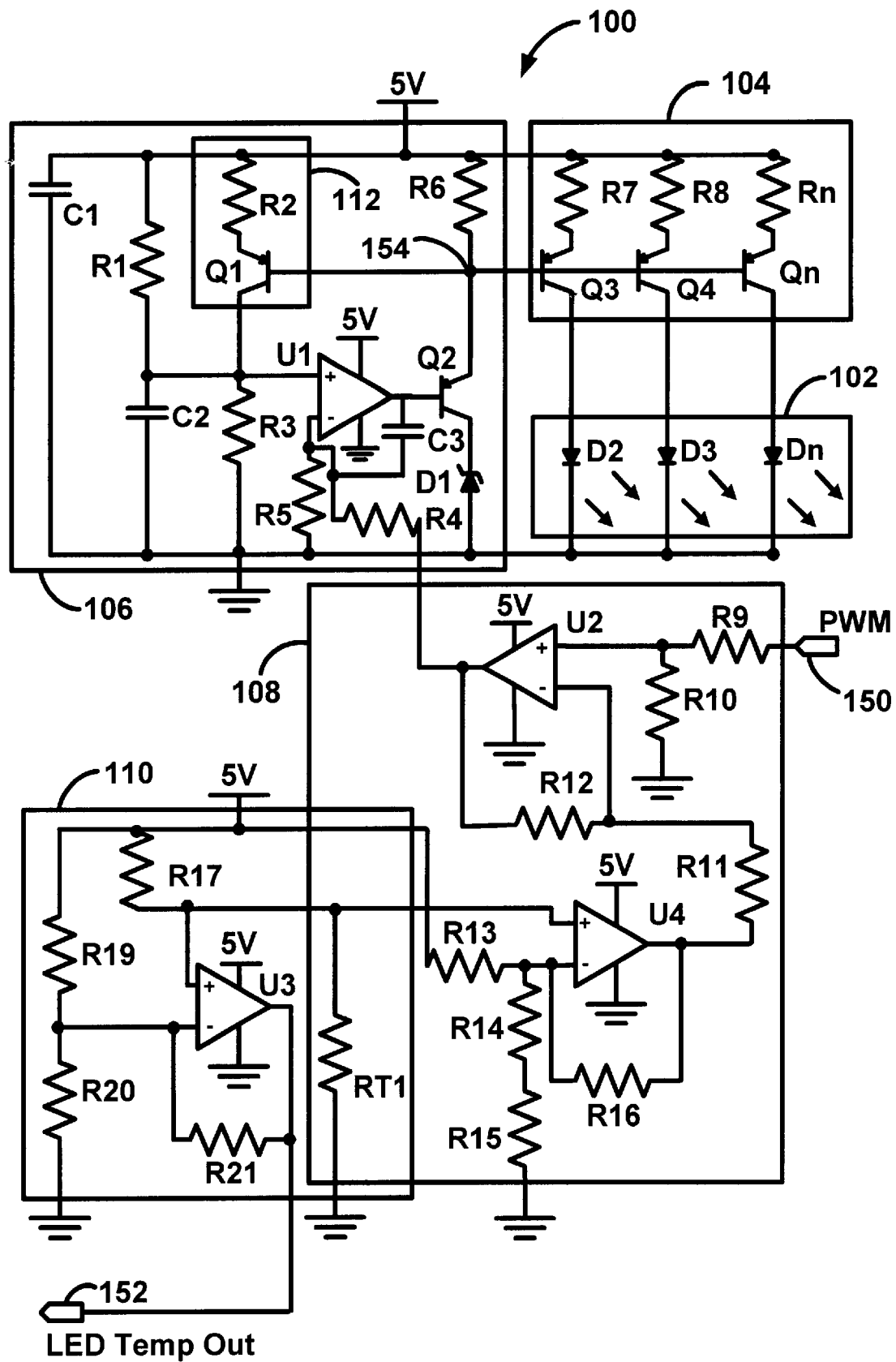
FIG. 1 illustrates a circuit diagram of a light emitting diode circuit of an embodiment of the invention.

FIG. 1 illustrates an embodiment of an LED circuit 100. The LED circuit 100 may include a parallel LED array 102, a current source circuit 104, a control circuit 106, an optional temperature derating circuit 108, and an optional temperature monitoring circuit 110.

The parallel LED array 102 includes a plurality of LEDs D2, D3, and Dn connected in parallel. The LEDs may be white or colored LEDs, such as red, green, and blue LEDs, other colored LEDs, or a combination of different types of LEDs. The LED labeled "Dn" represents the nth LED where n is the total number of diodes. While FIG. 1 illustrates only three LEDs in the LED array 102, the LED array 102 may have any number of LEDs, for example 2 to 1,000 LEDs for some applications and many more LEDs, such as 50,000, for other applications. There is no limit to the number of LED that could be in the LED array 102. Any additional LEDs will have corresponding current source transistors and emitter resistors in a similar configuration as the current source transistors Q3, Q4, and Qn and the emitter resistors R7, R8, and Rn.

The LEDs D2, D3, and Dn may each be separately current sourced to provide consistent LED brightness. This eliminates most brightness variations caused by LED forward voltage variations. The cathode terminals of each of the LEDs D2, D3, and Dn are connected with ground at a ground node. The common ground connection may be connected with a heat sink to transfer heat away from the LEDs. The anode terminal of the LEDs D2, D3, Dn connects with the current source transistor Q3, Q4, Qn. By connecting the cathode terminal of the parallel LEDs D2, D3, and Dn diodes to ground, a superior thermal conductive path is established that reduces the LED junction temperature and equalizes the junction temperatures among the parallel diodes. Since the luminous intensity of an LED decreases dramatically as the junction temperature increases, equalization of the junction temperatures helps maintain a more uniform brightness among the LEDs D2, D3, and Dn.

The current source circuit 104 supplies the LED array 102 with substantially uniform current to each LED, D2, D3, and Dn. Since the brightness of an LED is directly related to the current passing through the LED, accurate control of the LED current allows proper LED performance and life expectancy. The anode terminals of the LEDs D2, D3, and Dn are connected with a collector terminal of the respective current source transistor, Q3, Q4, and Qn. A common control node interconnects the base terminals of the current source transistors Q3, Q4, and Qn. The emitter terminals of the current source transistors, Q3, Q4, and Qn, are connected to the supply voltage via an emitter resistor R7, R8, and Rn, respectively. The current source transistors, Q3, Q4, and Qn may have substantially identical characteristics. Thus, the characteristic of the current source transistors, Q3, Q4, and Qn with respect to various collector currents ("Ic") and base to emitter voltages (Vbe) will be substantially similar since the transistor temperatures will be substantially identical. The base terminals of the current source transistors, Q3, Q4, and Qn are connected at a common control node 154.

The emitter resistors R7, R8, and Rn further reduce variations in the current from the current source transistors, Q3, Q4, and Qn. Thus, the parallel LEDs D2, D3, and Dn maintain consistent brightness. The emitter resistor R7, R8, and Rn preferably may have substantially identical characteristics. When the LEDs, D2, D3, and Dn, are white LEDs, the emitter resistors R7, R8, and Rn may be 0.1 to 1,000 Ohm resistors. The emitter resistors R7, R8, and Rn preferably have low resistance, such as 5 Ohms. When color diodes are being driven by the current source circuit 104, the value of the emitter resistors R7, R8, and Rn may be selected to achieve a different desired current level for each LED to achieve proper white balance.

The control circuit 106 provides fault tolerance protection when one or more LEDs in the LED array 102 fails. An LED may fail by a short or an open. When an LED fails open, the LED disconnects the collector terminal of the current source transistor. When an LED fails closed, the LED connects the collector terminal of the current source transistor to ground. Such LED failures tend to affect the voltage at the common control node 154 of the current source transistors. The control circuit 106 stabilizes the voltage at the common base node via feedback circuitry. When the voltage at the common base node is stable, the remaining LEDs continue to be driven at the prescribed level.

The transistor Q2 and the zener diode D1 provide load dumping when an LED fails open. The current that would have passed through the LED is diverted to the base terminal of the current source transistor connected with the LED that is open. This additional current is received by the transistor Q2 and dissipated through the zener diode D1. The number of LEDs that may fail in the open position while the LED circuit 100 remains operational is limited by the power rating of the transistor Q2 and the zener diode D1. For example, a zener diode D1 with a derated power limit of 500 mW allows for four open LEDs. A resistor or other device may alternatively by used in place of the zener diode D1.

An LED failure by a short is an unlikely failure. However, if an LED shorts out, the current source transistor associated with that LED continues to supply the shorted LED with the same current as the other LEDs. Thus, the brightness of the other LED is unaffected by the shorted LED.

A sample current source circuit 112 includes a transistor Q1 and a resistor R2 that have characteristics that are substantially similar to those of the current control transistors Q3, Q4, and Qn and the emitter resistors R7, R8, and Rn. By mirroring the characteristics of the current source circuit, the current through the sample current source circuit 112 may be monitored to estimate the current that passes through the LEDs. The sample current source circuit 112 provides a current substantially similar to the current that passes through each of the LEDs, D2, D3, Dn. The sample current is converted by a resistor R3 to a reference voltage. The sample current source circuit 112 eliminates the need for additional circuitry to sample the actual current through the LEDs, D2, D3, Dn. The sample current source circuit 112 allows the cathodes of the LEDs, D2, D3, Dn to be connected with the ground node instead of sampling circuitry. The resistor R1 provides an offset to ensure that the LEDs can be completely turned off even with a small output voltage at node 150 commonly associated with PWM controllers.

The control circuit 106 uses a current feedback circuit to more precisely control the current to the parallel LEDs. The additional control allows the parallel LEDs to be operated closer to their maximum rating, which is where the LEDs are at their brightest. The error amplifier U1 of the control circuit 106, may be configured to provide a bandwidth limiting function that eliminates high rate of change currents transients. This elimination reduces or completely suppresses electromagnetic interference (EMI) emissions.

The error amplifier U1, an operational amplifier, typically operates in a linear mode of operation. The input to the error amplifier U1 receives a voltage divided output from the operational amplifier U2. The output voltage from operational amplifier U2 is divided by the voltage divider formed by the resistors R4 and R5.

The temperature derating circuit 108 derates current to the LED array 102 as the temperature increases to prolong the life expectancy of the LEDs. The temperature derating circuit 108 is connected with the control circuit 106 and an intensity input node 150. The input voltage from the operational amplifier U2 controls the brightness of the LED array 102. The operational amplifier U2 is configured as a differential amplifier where the ratios of the operational amplifier's resistors are substantially balanced, that is R12/R11= R10/R9. When the ratios of the operational amplifier's resistor R12/R11 and R10/R9 are both substantially equal to one, the differential gain of the operational amplifier U2 is substantially unity. When the output of the operational amplifier U4 is at substantially ground during a non-derating condition, the operational amplifier U2 passes the input signal from input node 150 with the gain set by the resistor ratios, which may be a unity gain. The intensity level signal may be a steady DC voltage, a pulse width modulated signal, or an other type of signal.

The derating operational amplifier U4 normally operates in a rail-to-rail mode. When the LED array 102 is operating in a normal operating temperature range, the output of the derating operational amplifier U4, known as the temperature derating level, is substantially ground. As the temperature of the LED array 102 increases, the temperature derating level increases after a predetermined LED threshold temperature is reached. Since the thermal resistor RT1 is connected with the same ground and preferably in close proximity to the LED array 102, the resistance of the thermal resistor RT1 varies as a function of the temperature of the solder near the cathode terminals of the LEDs D2, D3, and Dn. The thermal resistor RT1, also called a temperature sensor, has a resistance that varies as a function of a measured temperature. For example, the thermal resistor RT1 may be a model KT230 available from Infineon Technologies A. G. The model KT230 is a temperature dependent resistor with a resistance tolerances of +/−3% at 1,000 Ohms, a temperature range of −50 degree Centigrade to +150 degree Centigrade, and is available in SMD or leaded or customized packages. The model KT230 has a linear output, a positive temperature coefficient, a long term stability, a fast response time, and is polarity independent due to symmetrical construction. Other commonly available temperature sensors, such as models LM135 and LM50 from the National Semiconductor, Inc., may also be used.

The operational amplifier U2 receives a higher output voltage from the derating operational amplifier U4 through resistor R11. The output voltage from the derating operational amplifier U4 acts as a negative offset to the input voltage at the input node 150. By reducing the output voltage of the operational amplifier U2, the error amplifier U1 increases its output voltage which causes the voltage at the common base node 154 to be increased. This results in the current source transistors Q3, Q4, and Qn allowing less current to flow through the LED array 102. The LEDs D2, D3, and Dn then become less bright as the temperature increases. For example, if the input voltage at the input node 150 is 5 VDC and the temperature derating level is 1.5V, the output of the operation amplifier U2 is 3.5V. The temperature derating circuit 108 may shut off the LED array 102 if the measured temperature reaches a predetermined temperature threshold.

The temperature monitoring circuit 110 provides a temperature output signal at output node 152 that indicates a temperature associated with the LED array 102. The LED temperature output signal may be a function of the LED temperature as measured by the thermal resistor RT1. The thermal resistor RT1 may be used for the temperature monitoring circuit 110 and the temperature derating circuit 108. The temperature monitor amplifier U3 monitors a voltage difference between a first voltage divider circuit R19 and R20 and a second voltage divider circuit R17 and RT1 to provide an output voltage that is proportional to the LED temperature. The output of the temperature monitor amplifier U3 is connected with the output node 152. The temperature monitoring output 152 may be used by an external controller to adjust the drive level to input 150 to compensate for LED luminance changes as a function of temperature.

The input node 150 of the LED circuit 100 may receive an input signal from a microprocessor or other controller. The input signal may be a pulse width modulated ("PWM") signal, a DC voltage signal, or other type of signal. A PWM input signal controls the intensity of the LED based on the duty cycle and/or the voltage level of the input signal. Generally, as the duty cycle of the input signal increases, the LEDs D2, D3, and Dn become brighter. A DC voltage input signal controls the intensity of the LED based the voltage level of the input signal. Generally, as the voltage level at the input node 150 increases, the LEDs D2, D3, and Dn become brighter.

The LED circuit 100 may operate with a supply voltage of between 1 volt to 15 volts, and preferably it operates at approximately 5 volts. Since the LED circuit 100 includes a parallel LED array 102, a high power inverter and higher supply voltage commonly required for serial LED circuits is not required. The LED circuit 100 may be a band limited low electromagnetic interference circuit controlled by the values of R4, R5, C3, R3, and C2.

D. Example Embodiment of the Led Circuit

The LED circuit 100 of FIG. 1 may include components as indicated in Table 1. Other types of components and components of different values may also be used in the LED circuit 100 as will be apparent to one of skill in the art.

TABLE 1

| Ref. | Description |
|---|---|
| C1 | A capacitor, for example a 1 uF capacitor. |
| C2–3 | A capacitor, for example a 0.01 uF capacitor. |
| Q1–4 | A PNP transistor, for example, a model MBT3906DW1T1 transistor from Motorola, Inc. that is available in a dual package. |
| Qn | A PNP transistor, for example, a model MBT3906DW1T1 transistor from Motorola, Inc. that is available in a dual package. |
| D1 | A Zener diode, for example a 3.3 volt Zener diode. |
| D2–3 | A light emitting diode. For example, white SIDELED Infineon model LWA67C, a white LED from Infineon model LW E673 or LW E67C, red LED model LSA677-Q, green LED model LTA673-R24, or a blue LED LBA673-N24 all from Infineon Technology AG. |
| Dn | A light emitting diode. For example, white SIDELED Infineon model LWA67C, a white LED from Infineon model LW E673 or LW E67C, red LED model LSA677-Q, green LED model LTA673-R24, or a blue LED LBA673-N24 all from Infineon Technology AG. |
| U1–4 | An operational amplifier, for example a model LMV321 available from National Semiconductor Corp. or a model TLC 2274 Rail-to-Rail Operational Amplifier available from Texas Instruments, Inc. |
| R1 | A resistor, for example a 4.99K Ohms resistor. Other resistance values may also be used, for example, 0.5K to 50K Ohms. |
| R2 | A resistor, for example a 5 Ohms resistor. Other resistance values may also be used, for example, 0.5 to 500 Ohms. |
| R3 | A resistor, for example a 100 Ohms resistor. Other resistance values may also be used, for example, 0.1 to 10K Ohms. |

TABLE 1-continued

| Ref. | Description |
|---|---|
| R4 | A resistor, for example a 16.5k Ohms resistor. Other resistance values may also be used, for example, 165 to 1650K Ohms. |
| R5 | A resistor, for example a 25K Ohms resistor. Other resistance values may also be used, for example, 250 to 2,500K Ohms. |
| R6 | A resistor, for example a 4.99K Ohms resistor. Other resistance values may also be used, for example, 0.5K to 50K Ohms. |
| R7 | A resistor, for example a 5 Ohms resistor. Other resistance values may also be used, for example, 0.5 to 500 Ohms. |
| R8 | A resistor, for example a 5 Ohms resistor. Other resistance values may also be used, for example, 0.5 to 500 Ohms. |
| Rn | A resistor, for example a 5 Ohms resistor. Other resistance values may also be used, for example, 0.5 to 500 Ohms. |
| R9 | A resistor, for example a 20K Ohms resistor. Other resistance values may also be used, for example, 200 to 200K Ohms. |
| R10 | A resistor, for example a 20K Ohms resistor. Other resistance values may also be used, for example, 250 to 250K Ohms. |
| R11 | A resistor, for example a 20K Ohms resistor. Other resistance values may also be used, for example, 250 to 250K Ohms. |
| R12 | A resistor, for example a 20K Ohms resistor. Other resistance values may also be used, for example, 250 to 250K Ohms. |
| R13 | A resistor, for example a 1.5k Ohm resistor. Other resistance values may also be used, for example, 150 to 150K Ohms. |
| R14 | A resistor, for example a 1.5K Ohm resistor. Other resistance values may also be used, for example, 150 to 150K Ohms. |
| R15 | A resistor, for example a 100 Ohm resistor. Other resistance values may also be used, for example, 1 to 100K Ohms. |
| R16 | A resistor, for example a 31.6K Ohm resistor. Other resistance values may also be used, for example, 316 to 316K Ohms. |
| R17 | A resistor, for example a 1.5K Ohm resistor. Other resistance values may also be used, for example, 150 to 150K Ohms. |
| R19 | A resistor, for example a 1.5K Ohm resistor. Other resistance values may also be used, for example, 150 to 150K Ohms. |
| R20 | A resistor, for example a 887 Ohm resistor. Other resistance values may also be used, for example, 87 to 887K Ohms. |
| R21 | A resistor, for example a 1.3K Ohm resistor. Other resistance values may also be used, for example, 130 to 130K Ohms. |
| RT1 | A resistor with a temperature dependant resistance, for example KT230 available from Infineon Technology A.G. |

E. Application of the Led Circuit

Figure 2:
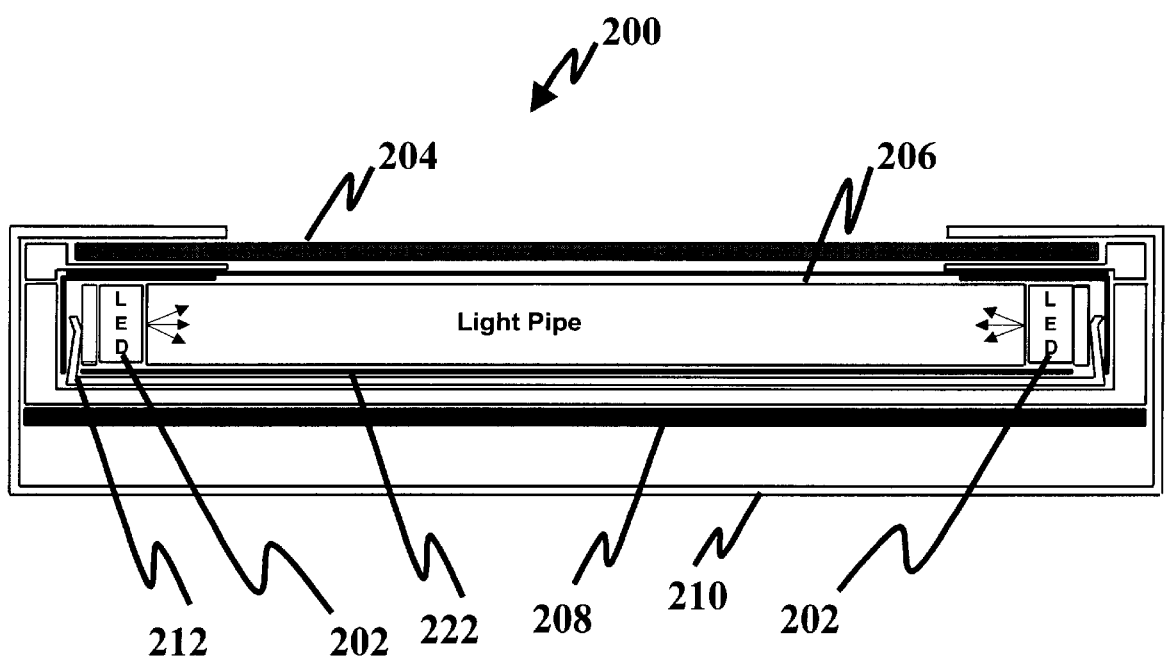
FIG. 2 illustrates an embodiment of a display that includes a liquid crystal display and a back lighting LED array.

FIG. 2 illustrates an application of the LED circuit 100 (FIG. 1) in a display unit 200 that includes an active matrix LCD 204 and a printed wiring board 222. For example, the AMLCD 204 may be a 3.8 inch AMLCD available from Sharp Electronics Corporation. A frame 210 houses at least portions of the display unit 200. The LED array 202 provides back lighting for the active matrix LCD 204 via the light pipe 206. The LED control circuitry may include, for example, the current source circuit 104 (FIG. 1), control circuit 106 (FIG. 1), temperature derating circuit 108 (FIG. 1), and temperature monitoring circuit 110 (FIG. 1). The LED control circuitry may be located on a printed wiring board 222. The LED array 202 may be on the same printed wiring board 208 as the LED control circuitry. Optionally the LED array 102, current sources 104 and RT1 may be located on the PWB 222 while the remaining circuit, for example the current source circuit 104, control circuit 106, temperature derating circuit 108, and temperature monitoring circuit 110, may be located on a second printed wiring board 208.

Other components may be added to ease assembly, maintenance, or for other mechanical-related or thermal-related reasons, such as the heat sink 212. The display unit 200 may be adapted for use in an automotive application, such as a radio display, a dashboard display, a navigation display, a climate control display, other automotive display, or other display such as computer display, personal digital assistant display, cellular telephone display, and other displays.

Figure 3:
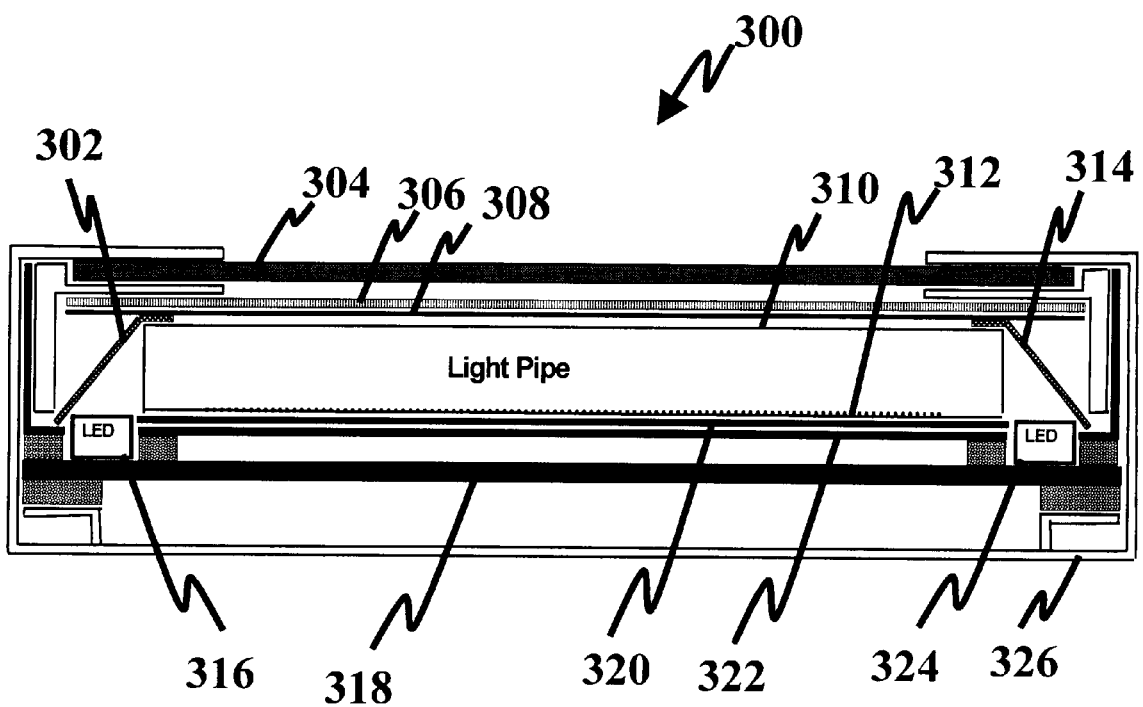
FIG. 3 illustrates a second embodiment of a display.

FIG. 3 illustrates an application of the LED circuit 100 (FIG. 1) in a display unit 300. A metal frame 326 houses at least a portion of the display unit 300. The LED arrays 316 and 324 are mounted on the printed circuit board 318, which also includes the LED circuit 100. The light from the LED arrays 316 and 324 is reflected by reflectors 302 and 314 into the light pipe 310. An optional shield 322, such as a metal shield, may be placed between the printed circuit board 318 and the light pipe 310. An enhanced diffuse reflector ("EDR") 320 may be located between the metal shield 322 and the light pipe 310. The light pipe 310 may include a light extracting surface 312. The light from the light pipe 310 may pass through a diffuser 308 and a reflective polarizer 306 before reaching the LCD 304.

Figure 4:
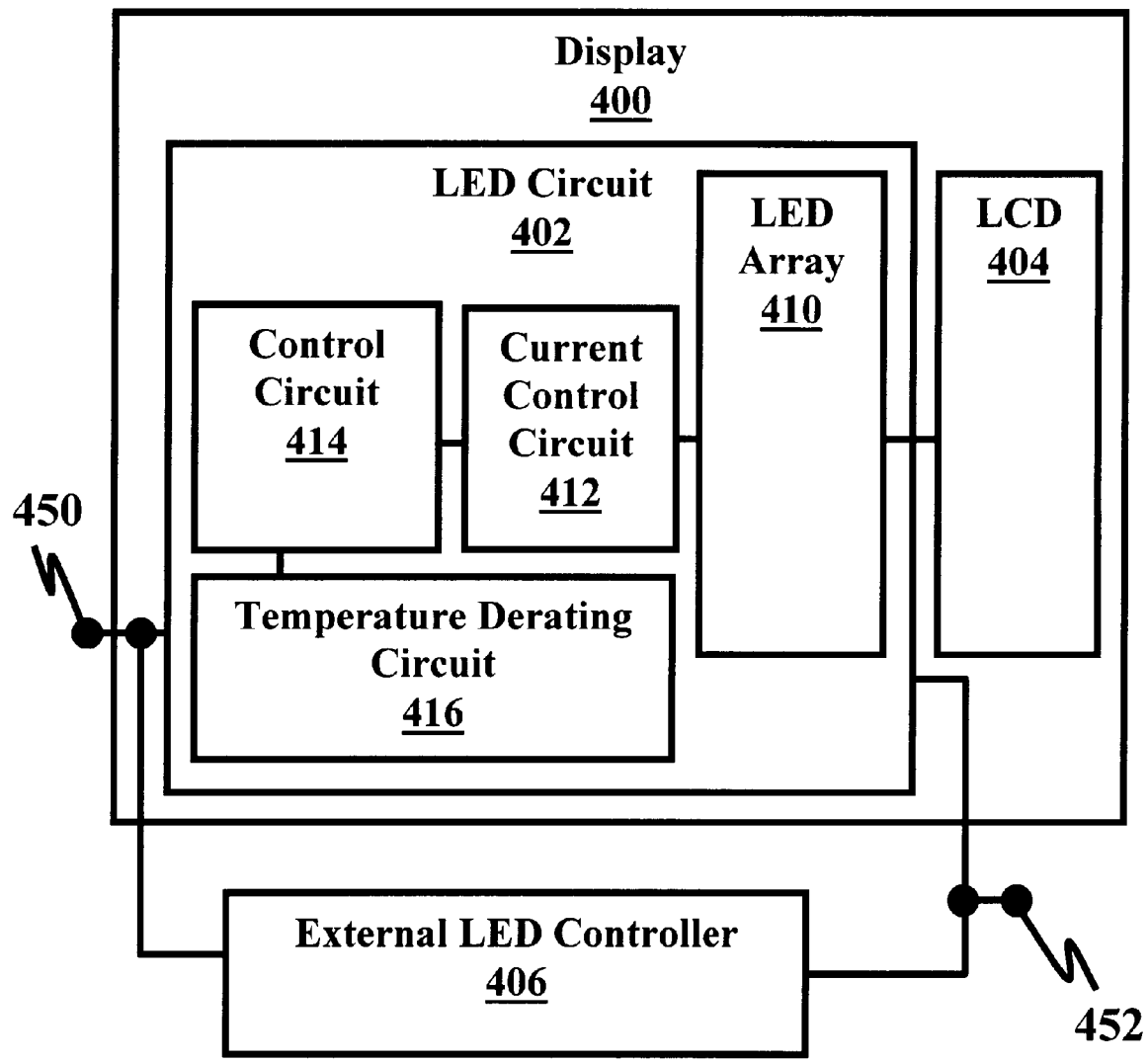
FIG. 4 illustrates a block diagram of an embodiment of a display that includes an LED circuit and an LCD.

FIG. 4 illustrates an embodiment of a display 400 that includes an LED circuit 402 and an LCD 404. The LCD 404 may be an active matrix LCD. The LED circuit 402 may be similar to the LED controller 100 (FIG. 1). The LED circuit 402 may include an LED array 410 for back lighting the LCD 404, a current control circuit 412 for controlling the intensity of the LED array 410, a control circuit 414, also called a feedback control circuit, that controls the current control circuit 412, a temperature derating circuit that adjusts the intensity of the LED array 410 as a function of a measured temperature, for example the solder temperature at the cathode terminal of the LEDs in the LED array 410.

An optional LED controller 406 controls the intensity of the LED array 410 by applying an input signal at input node 450. The LED controller 406 may be a microprocessor or other type of controller. The LED controller 406 may generate an input signal that includes a pulse width modulated ("PWM") signal, a DC voltage signal, and/or other type of signal. A PWM input signal controls the intensity of the LED based on the duty cycle and/or the voltage level of the input signal. Generally, as the duty cycle of the input signal increases, the LED array 410 becomes brighter. A DC voltage input signal controls the intensity of the LED based the voltage level of the input signal. Generally, as the voltage level at the input node 450 increases, the LED array 410 becomes brighter.

Optionally, the LED controller 406 may monitor the output temperature signal at output node 452 and adjust the intensity signal at the input node 450 as a function of the output temperature signal. As the output temperature signal indicates an increase in the temperature of the LED array 410, the LED controller 406 may increase the input signal to increase the drive of the LED array 410, thereby maintaining constant LED luminance. The LED controller 406 may include a software module that monitors the LED temperature and derates the LEDs as a function of the LED temperature.

Figure 5:
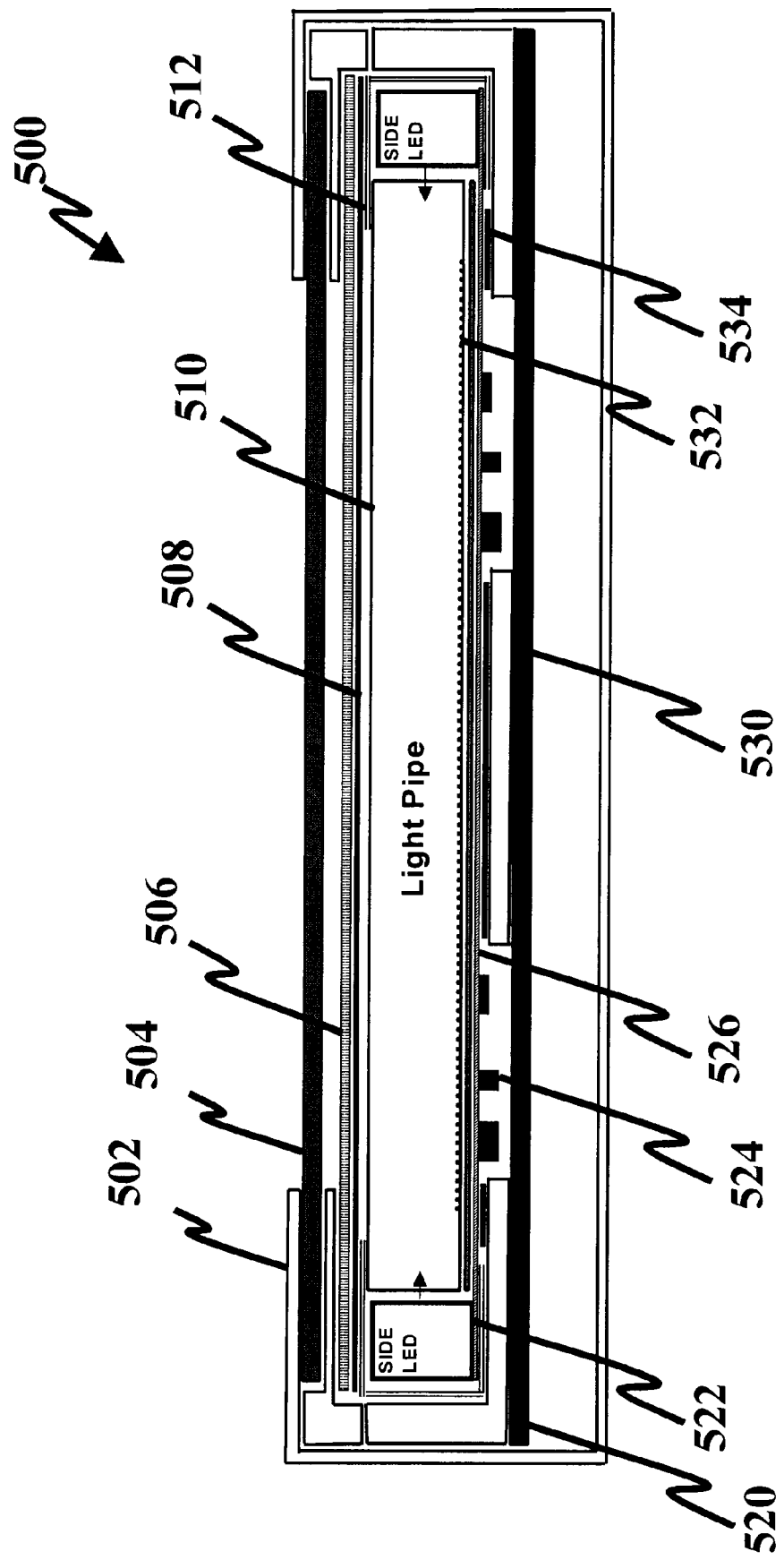
FIG. 5 illustrates a third embodiment of a display that includes an LED circuit and an LCD.

FIG. 5 illustrates a third embodiment of a display 500 that includes an LED circuit and an LCD. The display 500 includes a frame 502 and 530, an AMLCD 504, a reflective polarizer 506, a diffuser 508, a light pipe 510, an enhanced specular reflector (ESR) 512, a first printed circuit board 520, a set of side LED arrays 522, an LED controller circuit 524, a second printed circuit board 526, a light extracting surface 532, and a thermally conductive pressure sensitive adhesive 534. The LED controller circuit 524 are connected to a first side of the second printed circuit board 526 and the LED array 522 is connected to the opposite side. The thermally conductive pressure sensitive adhesive 534 may be the Bergquist Bond Ply™ 100 available from the Bergquist Company of 18930 West 78th Street, Chanhassen, Minn. 55317.

Figure 6:
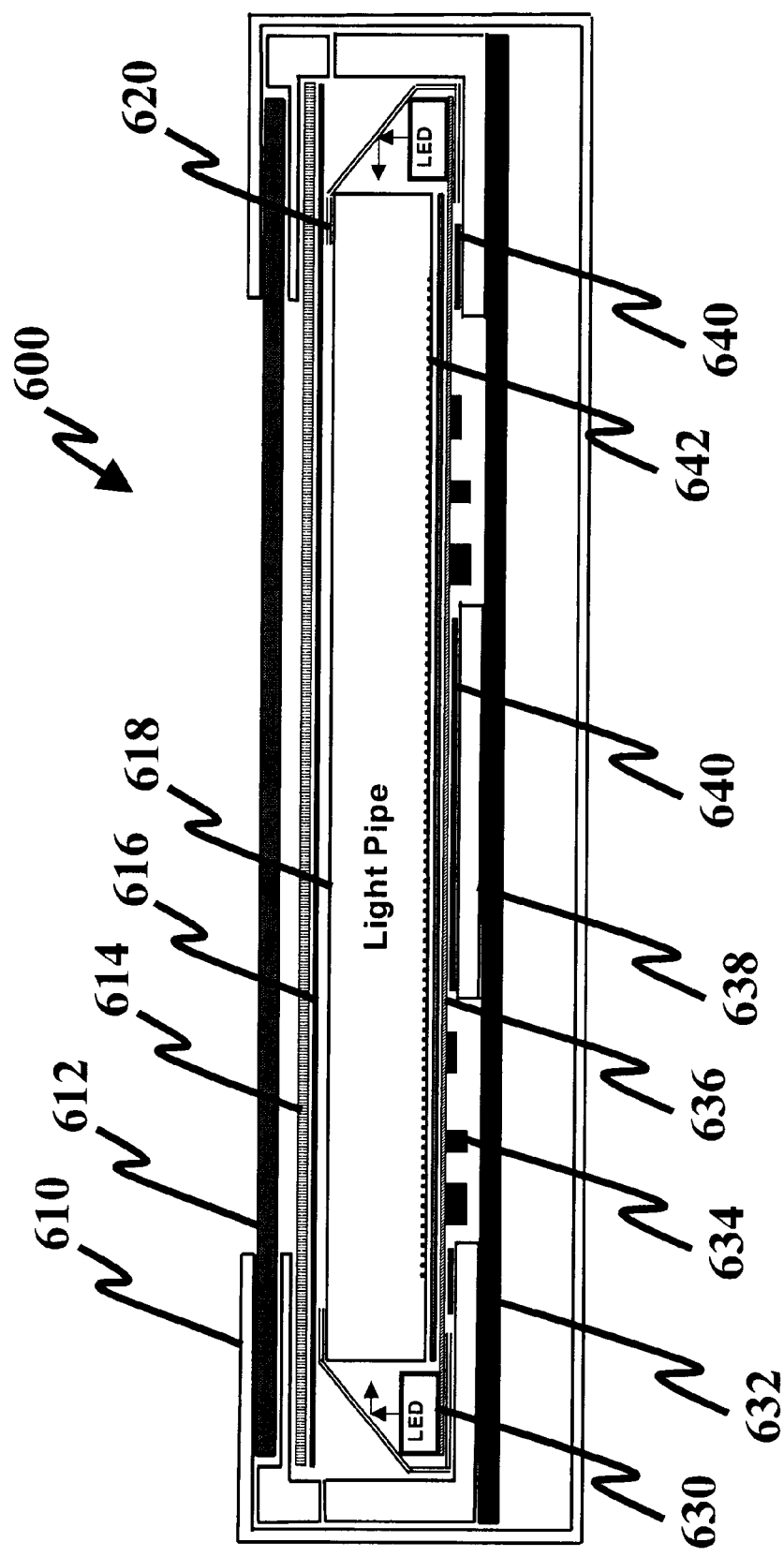
FIG. 6 illustrates a fourth embodiment of a display that includes an LED circuit and an LCD.

FIG. 6 illustrates a fourth embodiment of a display 600 that includes an LED circuit and an LCD. The display 600 includes a frame 610 and 638, an AMLCD 612, a reflective polarizer 614, a diffuser 616, a light pipe 618, an enhanced specular reflector (ESR) 620, a first printed circuit board 632, an LED array 630, an LED controller circuit 634, a second printed circuit board 636, a thermally conductive pressure sensitive adhesive 640, and a light extracting surface 642. The second printed circuit board 636 may be thinner than the first printed circuit board 632. The second printed circuit board 636 is thermally connected with the frame 610 via the thermally conductive pressure sensitive adhesive 640. The ESR 620 may be angled at approximately 45 degrees to reflect the light from the LED 630 such that a side LED is not required. The frame 610 forms a light cavity that contains the light pipe 618, the ESR 620, the LED array 630, and the diffuser 616. Optionally, the light cavity also includes the second printed circuit board 636.

As a person skilled in the art will recognize from the previous description and from the figures and claims, modifications and changes can be made to the preferred embodiments of the invention without departing from the scope of the invention defined in the following claims.

What is claimed is:

1. A light emitting diode device, comprising:
    a plurality of light emitting diodes each having anode and cathode terminals; and
    a current source circuit comprising a plurality of current source transistors;
    wherein the light emitting diodes are connected in parallel such that the anode terminal of each light emitting diode is electrically connected with a different current source transistor and the cathode terminal of each light emitting diode is electrically coupled with a ground node; and wherein a base terminal of each of the current source transistors is connected with a current control node.

2. The device of claim 1, further comprising a control circuit that maintains a voltage at the current control node substantially at a desired voltage level.

3. The device of claim 2, wherein the control circuit is responsive to an input intensity level signal received at an input node, wherein the desired voltage level at the current control node is a function of the input intensity level signal.

4. The device of claim 3, wherein the control circuit comprises a sample current source circuit that provides a reference current that is substantially similar to the current at the anode node of each of the LEDs.

5. The device of claim 4, wherein the sample current source circuit comprises a current source transistor with a base terminal connected with the current control node.

6. The device of claim 5, wherein the control circuit comprises a feedback control circuit connected with the sample current source circuit that maintains the voltage at the current control node at the desired voltage level after a failure of one or more of the plurality of light emitting diodes.

7. The device of claim 6, wherein the intensity level signal comprises a pulse width modulated signal.

8. The device of claim 6, wherein the intensity level signal comprises an analog DC voltage signal.

9. The device of claim 6, further comprising a temperature derating circuit electrically connected with the control circuit, wherein the temperature derating circuit adjusts the input intensity level signal such that the desired voltage level at the current control node is a function of the input intensity level signal and a temperature derating level.

10. The device of claim 9, wherein the temperature derating circuit decreases a brightness of the light emitting diodes when the temperature derating circuit detects a temperature increase above a temperature threshold.

11. The device of claim 9, wherein the temperature derating circuit comprises a substantially linear temperature sensing device connected with the ground node; wherein the temperature sensing device measures the temperature of solder connecting the cathode terminal of the light emitting diodes to the ground node.

12. The device of claim 11, wherein the linear temperature sensing device comprises a temperature dependant resistor.

13. The device of claim 12, further comprising a temperature monitoring circuit that provides a temperature output signal indicating the temperature of the solder connecting the cathode terminal of the light emitting diodes to the ground node.

14. The device of claim 13, wherein the light emitting diode control circuit is a band limited low electromagnetic interference circuit.

15. The device of claim 14 wherein the light emitting diode device operates with a supply voltage of less than ten volts.

16. The device of claim 14, wherein the light emitting diode device operates with a supply voltage of substantially five volts.

17. The device of claim 14, wherein the control circuit is tolerant of malfunctioning light emitting diodes.

18. The device of claim 17, wherein malfunction comprises a short in a plurality of the light emitting diodes.

19. The device of claim 17, wherein malfunction comprises an open in a plurality of the light emitting diodes.

20. The device of claim 1, wherein the plurality of light emitting diodes are adapted to provide back lighting for an active matrix liquid crystal display.

21. The device of claim 1, wherein the plurality of light emitting diodes comprise a plurality of colored light emitting diodes.

22. The device of claim 1, wherein the plurality of light emitting diodes comprise a plurality of white light emitting diodes.

23. The device of claim 22, wherein the plurality of light emitting diodes comprises at least five white light emitting diodes.

24. A display unit adapted for an automotive application, comprising:
    a liquid crystal display;
    a backlighting light emitting diode array comprising a plurality of light emitting diodes in a parallel configuration, where a cathode terminal of each light emitting diode is connected with a common ground node, where the backlighting light emitting diode array backlights the liquid crystal display;
    a current source circuit that maintains substantially identical amounts of electrical current supplied to each light emitting diode;
    a temperature derating circuit electrically connected with the current source circuit;
    wherein the temperature derating circuit reduces the light emitting diode array's intensity as a function of a temperature measured at the common ground node after a threshold is reached.

25. The display unit of claim 24 further comprising: a light pipe in proximity to the liquid crystal display and the light emitting diode array and a housing encasing at least a portion of the liquid crystal display the light pipe and the light emitting diode array.

26. The display unit of claim 25, further comprising:
    a light emitting diode controller that provides a pulse width modulated signal that controls the intensity of the light emitting diode array.

27. The display unit of claim 25, further comprising:
a light emitting diode controller that provides an analog direct current voltage signal that controls the intensity of the light emitting diode array.

28. The display unit of claim 25, wherein the light emitting diode controller comprises a microprocessor.

29. A method of controlling a parallel light emitting diode array, comprising:
monitoring a temperature of a light emitting diode array at a node connected with a light emitting diode;
providing a temperature adjusted signal to the light emitting diode;
monitoring a sample current source; and
adjusting the temperature adjusted signal as a function of a current from the sample current source.

30. A display unit, comprising:
a liquid crystal display;
a light pipe located behind the liquid crystal display;
a light emitting diode array;
an specular reflector that reflects light from the light emitting diode into the light pipe;
a circuit board having first and second sides, where the light emitting diode array connected with the first side and a light emitting diode array controller circuit connected to the other side, wherein the circuit board is within a light cavity of the display unit;
a frame housing the liquid crystal display, light pipe, light emitting diode array, and the circuit board, wherein the circuit board is thermally connected with the frame.

31. The display unit of claim 30 wherein the specular reflector is angled at substantially 45 degrees to reflect light from the light emitting diode array into the light pipe.

32. The display unit of claim 31, wherein the circuit board conducts heat from the light emitting diode array and the light emitting diode array controller circuit toward the frame.

33. The display unit of claim 32, wherein the circuit board is thermally connected with the frame in a plurality of locations.

34. The display unit of claim 33, further comprising a diffuser between the light pipe and the liquid crystal display.

35. The display unit of claim 34, further comprising a reflective polarizer between the diffuser and the liquid crystal display.

36. The display unit of claim 35, wherein the light emitting diode array comprises a plurality of side LEDs.

37. A light emitting diode device, comprising:
at least five white light emitting diodes each having anode and cathode terminals; and
a current source circuit comprising a plurality of current source transistors;
wherein the at least five white light emitting diodes are connected in parallel such that the anode terminal of each light emitting diode is electrically connected with a different current source transistor and the cathode terminal of each light emitting diode is electrically coupled with a ground node.

38. A display unit adapted for an automotive application, comprising:
a liquid crystal display;
a backlighting light emitting diode array comprising a plurality of light emitting diodes in a parallel configuration, where a cathode terminal of each light emitting diode is connected with a common ground node, where the backlighting light emitting diode array backlights the liquid crystal display;
a current source circuit that maintains substantially identical amounts of electrical current supplied to each light emitting diode;
a temperature derating circuit electrically connected with the current source circuit, wherein the temperature derating circuit reduces the light emitting diode array's intensity as a function of a temperature measured at the common ground node after a threshold is reached;
a light pipe in proximity to the liquid crystal display and the light emitting diode array;
a housing encasing at least a portion of the liquid crystal display, the light pipe, and the light emitting diode array; and
a light emitting diode controller that provides a pulse width modulated signal that controls the intensity of the light emitting diode array.

39. A display unit adapted for an automotive application, comprising:
a liquid crystal display;
a backlighting light emitting diode array comprising a plurality of light emitting diodes in a parallel configuration, where a cathode terminal of each light emitting diode is connected with a common ground node, where the backlighting light emitting diode array backlights the liquid crystal display;
a current source circuit that maintains substantially identical amounts of electrical current supplied to each light emitting diode;
a temperature derating circuit electrically connected with the current source circuit, wherein the temperature derating circuit reduces the light emitting diode array's intensity as a function of a temperature measured at the common ground node after a threshold is reached;
a light pipe in proximity to the liquid crystal display and the light emitting diode array;
a housing encasing at least a portion of the liquid crystal display, the light pipe, and the light emitting diode array; and
a light emitting diode controller that provides an analog direct current voltage signal that controls the intensity of the light emitting diode array.

40. The display unit of claim 39, wherein the light emitting diode controller comprises a microprocessor.

* * * * *